United States Patent
Yoshitomi (10) Patent No.: US 7,626,282 B2
(45) Date of Patent: Dec. 1, 2009

(54) PROTECTION DEVICE FOR PROTECTING EXTERNAL DEVICE AND METHOD OF CONTROLLING THE SAME

(75) Inventor: Naoto Yoshitomi, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 12/073,817

(22) Filed: Mar. 11, 2008

(65) Prior Publication Data
US 2008/0239608 A1    Oct. 2, 2008

(30) Foreign Application Priority Data
Mar. 30, 2007  (JP) .............................. 2007-092448
Jan. 16, 2008  (JP) .............................. 2008-006903

(51) Int. Cl.
*B60L 1/00* (2006.01)
(52) U.S. Cl. .................................................. 307/10.1
(58) Field of Classification Search ................. 307/10.1
See application file for complete search history.

(56) References Cited

U.S. PATENT DOCUMENTS 5,675,297 A * 10/1997 Gose et al. ................. 332/109

2006/0003713 A1 * 1/2006 Ouzillou et al. ............. 455/117

FOREIGN PATENT DOCUMENTS

| JP | A-10-283087 | 10/1998 |
| JP | A-2003-316711 | 11/2003 |
| JP | A-2006/264616 | 10/2006 |

OTHER PUBLICATIONS

Notice of Reason for Refusal mailed on Mar. 17, 2009 issued from the Japanese Patent Office in the corresponding Japanese patent application No. 2008-006903 (and English translation).

* cited by examiner

*Primary Examiner*—Robert L. Deberadinis
(74) *Attorney, Agent, or Firm*—Posz Law Group, PLC

(57) ABSTRACT

A protection device includes a connecting portion, power supply means, temperature detection means, temperature determination means, and prohibition means. The connecting portion is configured to be coupled with an external device for sending and receiving information with the external device. The power supply means supplies electric power to the external device through the connecting portion. The temperature detection means detects temperature in a vehicle compartment, and the temperature determination means determines whether the detected temperature is within a predetermined temperature limit. The prohibition means stops the power to the external device when the temperature determination means determines that the detected temperature is out of the predetermined temperature limit.

20 Claims, 5 Drawing Sheets

DAILY MAXIMUM / MINIMUM TEMPERATURES

|          | Tmax    | Tmin    |
|----------|---------|---------|
| MARCH 11 | △△ °C   | ☐☐ °C   |
| MARCH 10 | △△ °C   | ☐☐ °C   |
| MARCH 9  | △△ °C   | ☐☐ °C   |
| MARCH 8  | △△ °C   | ☐☐ °C   |
| ...      | ...     | ...     |

PROTECTION DEVICE FOR PROTECTING EXTERNAL DEVICE AND METHOD OF CONTROLLING THE SAME

CROSS REFERENCE TO RELATED APPLICATION

This application is based on Japanese Patent Applications No. 2007-92448 filed on Mar. 30, 2007, and No. 2008-6903 filed on Jan. 16, 2008, the contents of which are incorporated herein by reference in their entirety.

BACKGROUND OF THE INVENTION

1. Field of the Invention

The present invention relates to a protection device that has a connecting portion to be coupled with an external device and that can send and receive information with the external device. The present invention also relates to a method of controlling the protection device.

2. Description of the Related Art

Conventionally, a navigation device installed in a vehicle includes a navigation function for showing a travel route to a destination and an audio function for playing image and/or music.

JP-2003-316711A discloses a navigation device that has a connector terminal to be coupled with an external device including a mobile phone, a personal digital assistance (PDA), a portable audio player, and/or a universal serial bus (USB) memory. The navigation device can supply electricity to the external device and can read data from the external device for playing image and/or music.

Temperature in a vehicle compartment may change in a very wide range and a temperature environment in the vehicle compartment may be harder than an environment in which the external device is generally used. Thus, in a case where temperature in the vehicle compartment exceeds an operating temperature limit of the external device during the external device is used in the vehicle compartment, the external device may malfunction or may be broken.

In addition, in a case where a passenger gets away from the vehicle while connecting the external device with the connector terminal and temperature in the vehicle compartment increases or decreases over a storage temperature limit of the external device, the external device may be broken.

SUMMARY OF THE INVENTION

In view of the foregoing problems, it is an object of the present invention to provide a protection device having a connecting portion to be coupled with an external terminal. The protection device can prevent the external device from being broken due to a temperature environment. Another object of the invention is to provide a method of controlling the protection device.

According to a first aspect of the invention, a protection device includes a connecting portion, power supply means, temperature detection means, temperature determination means, and prohibition means. The connecting portion is configured to be coupled with an external device for sending and receiving information with the external device. The power supply means supplies electric power to the external device through the connecting portion. The temperature detection means detects temperature in a vehicle compartment. The temperature determination means determines whether the detected temperature is within a predetermined temperature limit. The prohibition means stops the power supply to the external device when the temperature determination means determines that the detected temperature is out of the predetermined temperature limit.

In the present protection device, when temperature in the vehicle compartment exceeds the predetermined temperature limit, the power supply to the external device is stopped. Thus, the external device is not supplied with electric power and is not operated when temperature in the vehicle compartment exceeds the predetermined temperature limit and the external device has a possibility of malfunctioning or being broken if the external device is operated. As a result, the present protection device can prevent the external device that is coupled with the protection device from malfunctioning or being broken due to a temperature environment.

According to a second aspect of the invention, a protection device includes a connecting portion, temperature detection means, temperature determination means, and warning means. The connecting portion is configured to be coupled with an external device for sending and receiving information with the external device. The temperature detection means detects temperature in a vehicle compartment. The temperature determination means determines whether a determination temperature based on the detected temperature is within a predetermined temperature limit. The warning means warns when the temperature determination means determines that the determination temperature is out of the predetermined temperature limit.

In the present protection device, the warning means warns a passenger when the determination temperature based on the detected temperature in the vehicle compartment is out of the predetermined temperature limit. Thus, by receiving the warning, the passenger can stop operating of the external device and/or can bring out the external device from the vehicle compartment depending on the situation. As a result, the present protection device can prevent the external device that is coupled with the protection device from malfunctioning or being broken due to a temperature environment.

According to a third aspect of the invention, a method of controlling a protection device includes: detecting temperature in a vehicle compartment; determining whether the detected temperature is within a predetermined temperature limit; and supplying electric power to the external device when the detected temperature is within the predetermined temperature limit and stopping power supply to the external device when the detected temperature is out of the predetermined temperature limit.

In the present method of controlling the protection device, when temperature in the vehicle compartment exceeds the predetermined temperature limit, the power supply to the external device is stopped. Thus, the external device is not supplied with electric power and is not operated when temperature in the vehicle compartment exceeds the predetermined temperature limit and the external device has a possibility of malfunctioning or being broken if the external device is operated. As a result, the present method can prevent the external device that is coupled with the protection device from malfunctioning or being broken due to a temperature environment.

BRIEF DESCRIPTION OF THE DRAWINGS

Additional objects and advantages of the present invention will be more readily apparent from the following detailed description of preferred embodiment when taken together with the accompanying drawings. In the drawings.

DETAILED DESCRIPTION OF THE PREFERRED EMBODIMENT

Figure 1:
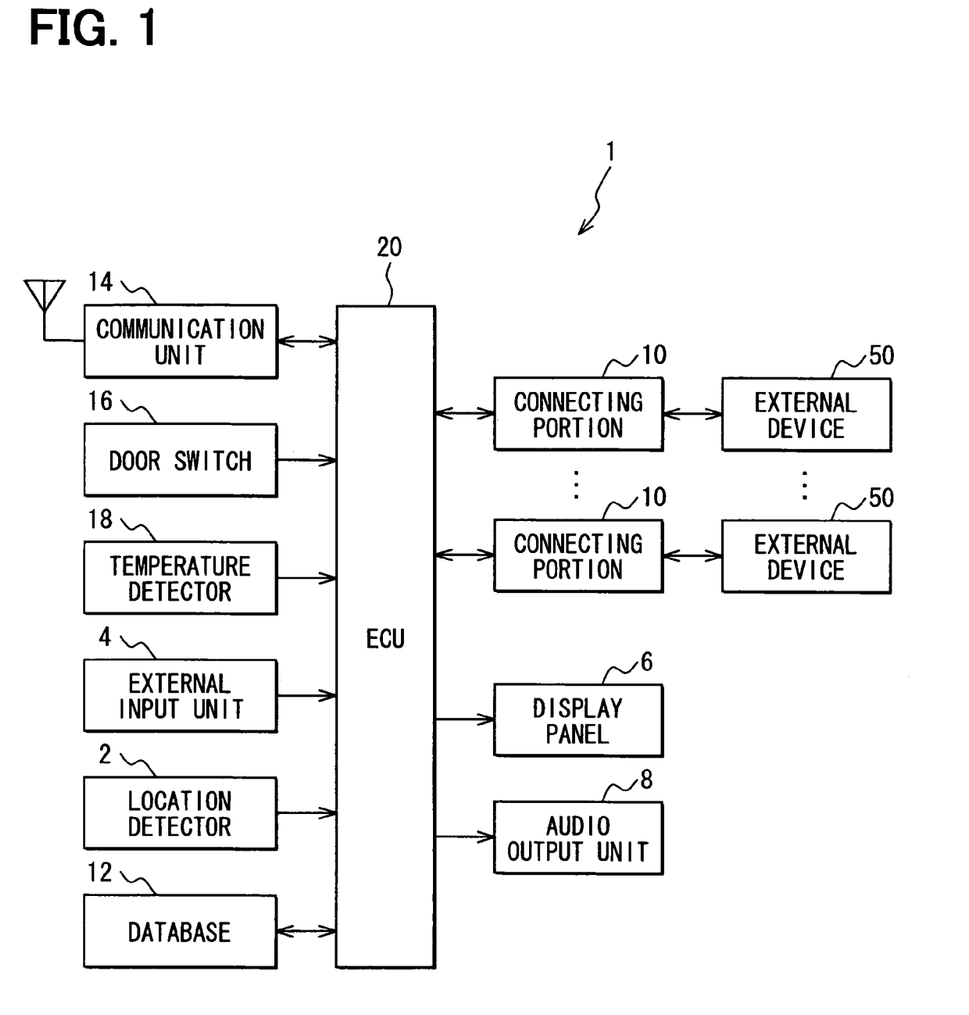
FIG. 1 is a block diagram showing a system configuration of a navigation device according to an embodiment of the invention.

In FIG. 1, a protection device according to an embodiment of the invention is shown as a navigation device 1 to be installed in a vehicle. The navigation device 1 includes a navigation function for showing a travel route to a destination by using image and/or sound. In addition, the navigation device 1 includes a connecting portion 10 to be coupled with an external device 50 and a function for preventing the external device 50 coupled with the connecting portion 10 from malfunctioning or being broken due to a temperature environment. The external device 50 includes a mobile phone, a personal digital assistance (PDA), a portable audio player, and/or a universal serial bus (USB) memory, for example.

Specifically, the navigation device 1 includes a location detector 2, an external input unit 4, a display panel 6, an audio output unit 8, the connecting portion 10, a database 12, a communication unit 14, a door switch 16, a temperature detector 18, a map-data input unit (not shown), and an electronic control unit (ECU) 20. The location detector 2 detects an actual location of the vehicle. The external input unit 4 includes an operating switch for inputting various commands to the navigation device 1. The display panel 6 shows a map and a route guidance. The audio output unit 8 generates various guidance messages and alarms. The database 12 stores various kinds of information. The communication unit 14 communicates with an information center by wireless communication. The door switch 16 detects an opening-and-closing operation of a door of the vehicle. The temperature detector 18 detects temperature in a vehicle compartment and stores the detected temperature in a memory. The map-data input unit reads a map-data from a storage media. The ECU 20 controls the above-described components.

The location detector 2 includes a global positioning system receiver (GPS receiver), a gyroscope, and a speed sensor, for detecting the actual location of the vehicle. The GPS receiver receives a radio wave from a GPS satellite through a GPS antenna for detecting a location, a direction, and a speed of the vehicle. The gyroscope detects an amount a rotational movement of the vehicle. The speed sensor includes a speed sensor element and a wheel sensor element for detecting a travel distance of the vehicle.

The external input unit 4 includes a touch panel integrally formed with the display panel 6 and a mechanical key switch provided in the vicinity of the display panel 6. The touch panel and the display panel 6 are integrally laminated. The touch panel may be a pressure-sensitive type, an electromagnetic induction type, a capacitance type, or a combination of these types, for example. Alternatively, the external input unit 4 may be a remote-control terminal.

The display panel 6 may be a color liquid-crystal display, for example. The display panel 6 shows a map around the actual location of the vehicle and the travel route to the destination based on a control by the ECU 20. In addition, the display panel 6 shows a warning image for attracting a passenger's attention.

The audio output unit 8 includes an amplifier and a speaker, for example. The audio output unit 8 generates the route guidance based on the control by the ECU 20. In addition, when the external device 50 such as the potable audio player is coupled with the connecting portion 10, the audio output unit 8 outputs sound based on a music data played by the external device 50. Furthermore, the audio output unit 8 generates a warning sound for attracting the passenger's attention.

The connecting portion 10 includes various connector terminals to be coupled with the external device 50 and is configured to send and receive information with the external device 50. For example, the connecting portion 10 includes a USB connector and a connector for a storage media. The connecting portion 10 is coupled with a battery (not shown) and supplies electric power to the external device based on the control by the ECU 20. The navigation device 1 may include a plurality of connecting portions 10, as shown in FIG. 1.

The database 12 includes a rewritable nonvolatile memory, e.g., an electrically erasable programmable read-only memory (EEPROM). The database 12 stores a device temperature data and a power necessity data in advance. The device temperature data includes an operating temperature limit, a storage temperature limit, and identification information (e.g., a type name, a product number, and a product name) of each device that can be coupled with the connecting portion 10. For example, the device temperature data may be stored as "XX USB memory: operating temperature limit $T_1$ ° C.-$T_2$ ° C., storage temperature limit $T_3$ ° C.-$T_4$ ° C." The power necessity data includes information about whether each device that can be coupled with the connecting portion 10 requires a power supply.

The communication unit 14 includes an antenna for communicating with the information center by wireless communication. The information center has a database including latest versions of the device temperature data and the power necessity data corresponding to new products. When the information center receives identification information of the external device 50 and a device-data request signal from the communication unit 14, the information center sends the device temperature data and the power necessity data of the external device 50 to the communication unit 14 based on the identification information.

The temperature detector 18 includes a microcomputer, a rewritable nonvolatile memory such as an EEPROM, and a temperature sensor. The microcomputer includes a central processing unit (CPU), a read only memory (ROM), and a random access memory (RAM). The temperature detector 18 performs a temperature recoding process shown in FIG. 2A.

Figure 2A:
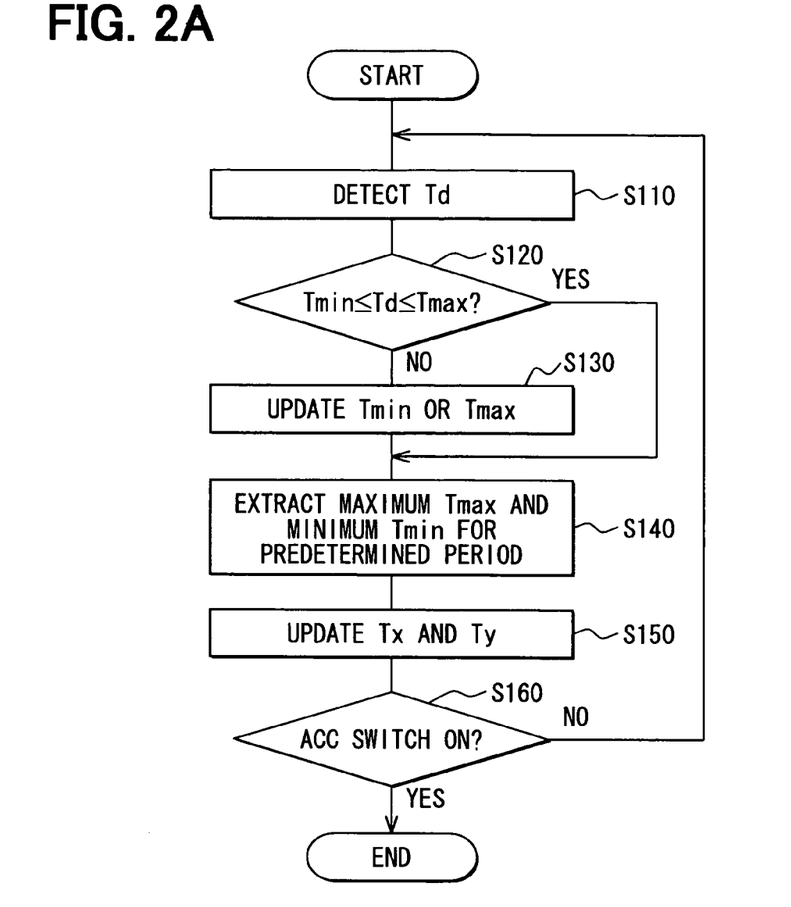
FIG. 2A is a flow diagram showing a temperature recording process performed by an ECU.

The temperature recording process starts when an accessory (ACC) switch is turned off. At S110, a temperature Td in the vehicle compartment is detected by the temperature sensor. At S120, the ECU 20 determines that whether the detected temperature Td is in a ranged from a daily minimum temperature $T_{min}$ to a daily maximum temperature $T_{max}$ that are stored in the memory. If the ECU 20 determines that the detected temperature Td is higher than the daily maximum temperature $T_{max}$ (NO at S120), the daily maximum temperature $T_{max}$ is updated by storing the detected temperature Td as the daily maximum temperature $T_{max}$ at S130. If the ECU 20 determines that the detected temperature Td is lower than the daily minimum temperature $T_{min}$ (NO at S120), the daily minimum temperature $T_{min}$ is updated by storing the detected temperature Td as the daily minimum temperature $T_{min}$ at S130. If the ECU 20 determines that the detected temperature Td is in the range from the daily minimum temperature $T_{min}$ to the daily maximum temperature $T_{max}$ (YES at S120), the ECU 20 advances the process to S140.

Figure 2B:
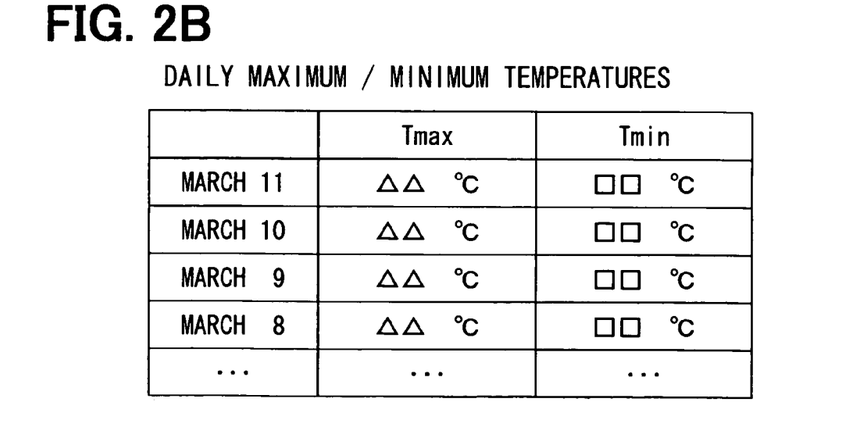
FIG. 2B is a view showing an exemplary data of daily maximum temperatures and daily minimum temperatures stored in a memory.

In the memory of the temperature detector 18, the daily maximum temperature $T_{max}$ and the daily minimum temperature $T_{min}$ are stored each day, as shown in FIG. 2B. At S140, the maximum temperature and the minimum temperature are extracted from the daily maximum temperatures $T_{max}$ and the daily minimum temperatures $T_{min}$ stored for the predetermined period (e.g., the past three days) including the day. At S150, the maximum temperature Tx and the minimum temperature Ty of the predetermined period are updated by storing the extracted temperatures.

At S160 the ECU 20 determines whether the ACC switch is turned on. If the ACC switch is turned on (YES at S160), the temperature recording process ends. If the ACC switch is turned off (NO at S160), the ECU 20 returns the process to S110, and the temperature recording process is repeated until the ACC switch is turned on.

In this way, the maximum temperature Tx and the minimum temperature Ty at a time where the ACC switch is turned off during the predetermined period are stored in the memory of the temperature detector 18. In the present example, the predetermined period is the past three days including the day. Alternatively, the predetermined period may be the past two days including the day and the day before, or may be longer than three days.

The ECU 20 includes a microcomputer that has a CPU, a ROM, a RAM, an input-output element, and a bus line for coupling these components. The ECU 20 performs various processes based on a program stored in the ROM and the RAM.

For example, the ECU 20 performs a map displaying process, a travel-route setting process, and a route guidance process. In the map displaying process, the ECU 20 reads a map data including the actual location from the storage media through the map-data input unit (not shown) based on the actual location of the vehicle detected by the location detector 2, and the display panel 6 shows a map including the actual location and a traveled route. In the travel-route setting process, the ECU 20 sets the travel route to the destination based on the command input from the external input unit 4. In the route guidance process, the display panel 6 shows an image for guiding the travel route and the audio output unit 8 generates a sound for guiding the travel route in accordance with the travel route set in the travel-route setting process.

In addition, the ECU 20 performs an operating-environment monitoring process for preventing the external device 50 coupled with the connecting portion 10 from malfunctioning or being broken due to the temperature environment, and a storage-temperature monitoring process for preventing the external device 50 from being broken due to the temperature environment.

The operating-environment monitoring process will now be described with reference to FIG. 3. The operating-environment monitoring process starts when the ACC switch is turned on. At S210, the ECU 20 determines whether the external device 50 is coupled with the connecting portion 10. If the ECU 20 determines that the external device 50 is not coupled with the connecting portion 10 (NO at S210), a process at S210 is repeated. If the ECU 20 determines that the external device 50 is coupled with the connecting portion 10 (YES at S210), the ECU 20 advances the process to S220. At S220, the ECU 20 reads identification information (e.g., a type name, a product number, and a product name) of the external device 50 from the external device 50 through the connecting portion 10. At S230, a temperature-condition setting process is performed. After the temperature-condition setting process is finished, the ECU 20 advances the process to S240.

At S240, the ECU 20 determines whether the temperature condition of the external device 50, i.e., the operating temperature limit and the storage temperature limit of the external device 50 are set in the temperature-condition setting process. If the ECU 20 determines that the temperature condition of the external device 50 is set (YES at S240), the ECU 20 advances the process to S250. At S250, the ECU 20 reads the maximum temperature Tx and the minimum temperature Ty at the time where the ACC switch is turned off during the predetermined period including the day, from the memory of the temperature detector 18.

At S260, the ECU 20 determines whether the maximum temperature Tx and the minimum temperature Ty are within the storage temperature limit. When the maximum temperature Tx and the minimum temperature Ty are within the storage temperature limit (YES at S260), the temperature in the vehicle compartment has a small possibility of exceeding the storage temperature limit of the external device 50 even when the ACC switch is turned off and the temperature in the vehicle compartment is not controlled. Thus, the ECU 20 advances the process to S270 without warning the passenger.

When at least one of the maximum temperature Tx and the minimum temperature Ty is out of the storage temperature limit (NO at S260), the ECU 20 advances the process to S380. At S380, the display panel 6 shows the warning image and/or the audio output unit 8 outputs the warning sound to warn the passenger to bring out the external device 50 from the vehicle compartment when the passenger gets out of the vehicle. Then, the ECU 20 advances the process to S270.

At S270, the ECU 20 reads a current temperature in the vehicle compartment from the temperature detector 18, and the ECU 20 determines whether the current temperature is within the operating temperature limit. If the current temperature is out of the operating temperature limit (NO at S270), the ECU 20 advances the process to S280. At S280, the display panel 6 shows the warning image and/or the audio output unit 8 generates the warning sound to warn the passenger that the current temperature is out of the operating temperature limit of the external device 50, and thereby the external device 50 has a possibility of malfunctioning or being broken when the external device 50 is operated.

At S290, the ECU 20 determines whether the external device 50 is a device that requires power supply based on the identification information of the external device 50 obtained at S220 and the power necessity data stored in the database 12. If the ECU 20 determines that the external device 50 is not a device that requires the power supply (NO at S290), the ECU 20 stops a communication with the external device 50 at S300, and advances the process to S310. At S310, the ECU 20 determines whether the current temperature is within the operating temperature limit.

If the current temperature is out of the operating temperature limit (NO at S310), the process at S310 is repeated. If the current temperature is within the operating temperature limit (YES at S310), the ECU 20 starts the communication with the external device 50, and the ECU 20 advances the process to S330.

At S290, if the ECU 20 determines that the external device 50 is a device that requires the power supply (YES at S290), the ECU 20 stops the power supply to the external device 50 and the communication with the external device 50 at S340. At S350, the ECU 20 determines whether the current temperature is within the operating temperature limit. If the current temperature is out of the operating temperature limit (NO at S350), the process at S350 is repeated. If the current temperature is within the operating temperature limit (YES at S350), the ECU 20 starts the power supply to the external device 50 and the communication with the external device 50 at S360. Then, the ECU 20 advances the process to S330.

At S240, if the ECU 20 determines that the temperature condition is not set (NO at S240), the ECU 20 determines that a protection of the external device 50 is not required, and advances the process to S370. At S370, the ECU 20 starts the communication with the external device 50, and starts the power supply to the external device 50 if the external device 50 requires power supply. Then, the operating-environment monitoring process ends.

At S270, if the ECU 20 determines that the current temperature is within the operating temperature limit (YES at S270), the ECU 20 advances the process to S390. At S390, the ECU 20 starts the communication with the external device 50, and starts the power supply to the external device 50 if the external device 50 requires power supply. Then, the ECU 20 advances the process to S330.

At S330, the ECU 20 determines whether the ACC switch is turned off. If the ACC switch is turned on (NO at S330), the ECU 20 repeats the process from S270. If the ACC switch is turned off (YES at S330), the operating-environment monitoring process ends.

Next, the temperature-condition setting process performed at S230 in the operating-environment monitoring process will be described with reference to FIG. 4. When the temperature-condition setting process starts, the ECU 20 searches through the database 12 at S410, and the ECU 20 determines whether the operating temperature limit and the storage temperature limit of the external device 50 (i.e., the device temperature data of the external device 50) are stored in the database 12 based on the identification information of the external device 50 obtained at S220. If the device temperature data of the external device 50 is stored in the database 12 (YES at S420), the ECU 20 advances the process to S480. At S480, the ECU 20 reads the operating temperature limit and the storage temperature limit of the external device 50 from the database 12, and sets the obtained operating temperature-limit and the obtained storage temperature-limit as the temperature condition. Then, the temperature-condition setting process ends.

At S420, if the ECU 20 determines that the device temperature data is not stored in the database 12 (NO at S420), the ECU 20 advances the process to S430. At S430, the ECU 20 accesses to an external database (i.e., a database at the information center) through the communication unit 14, and sends the device-data request signal with the identification information of the external device 50 obtained at S220 to the information center.

At S440, the ECU 20 determines whether the device temperature data of the external device 50 is stored in the database at the information center based on a response from the information center. If the device temperature data is stored (YES at S440), the ECU 20 advances the process to S490. At S490, the ECU 20 reads the operating temperature limit and the storage temperature limit of the external device 50 from the database, and sets the obtained operating temperature-limit and the obtained storage temperature-limit as the temperature condition. At S500, the device temperature data obtained from the information center is stored in the database 12 with the identification information of the external device 50. Then, the temperature-condition setting process ends.

At S440, if the ECU 20 determines that the device temperature data is not stored in the database at the information center (NO at S440), the display panel 6 shows an entry screen for manually inputting the operating temperature limit and the storage temperature limit. At S460, the ECU 20 determines whether the operating temperature limit and the storage temperature limit are input by the passenger using the external input unit 4. If the operating temperature limit and the storage temperature limit are not input (NO at S460), the temperature-condition setting process ends. If the operating temperature limit and the storage temperature limit are input (YES at S460), the ECU 20 sets the input operating temperature-limit and the input storage temperature-limit as the temperature condition at S470, and the temperature-condition setting process ends.

Figure 5:
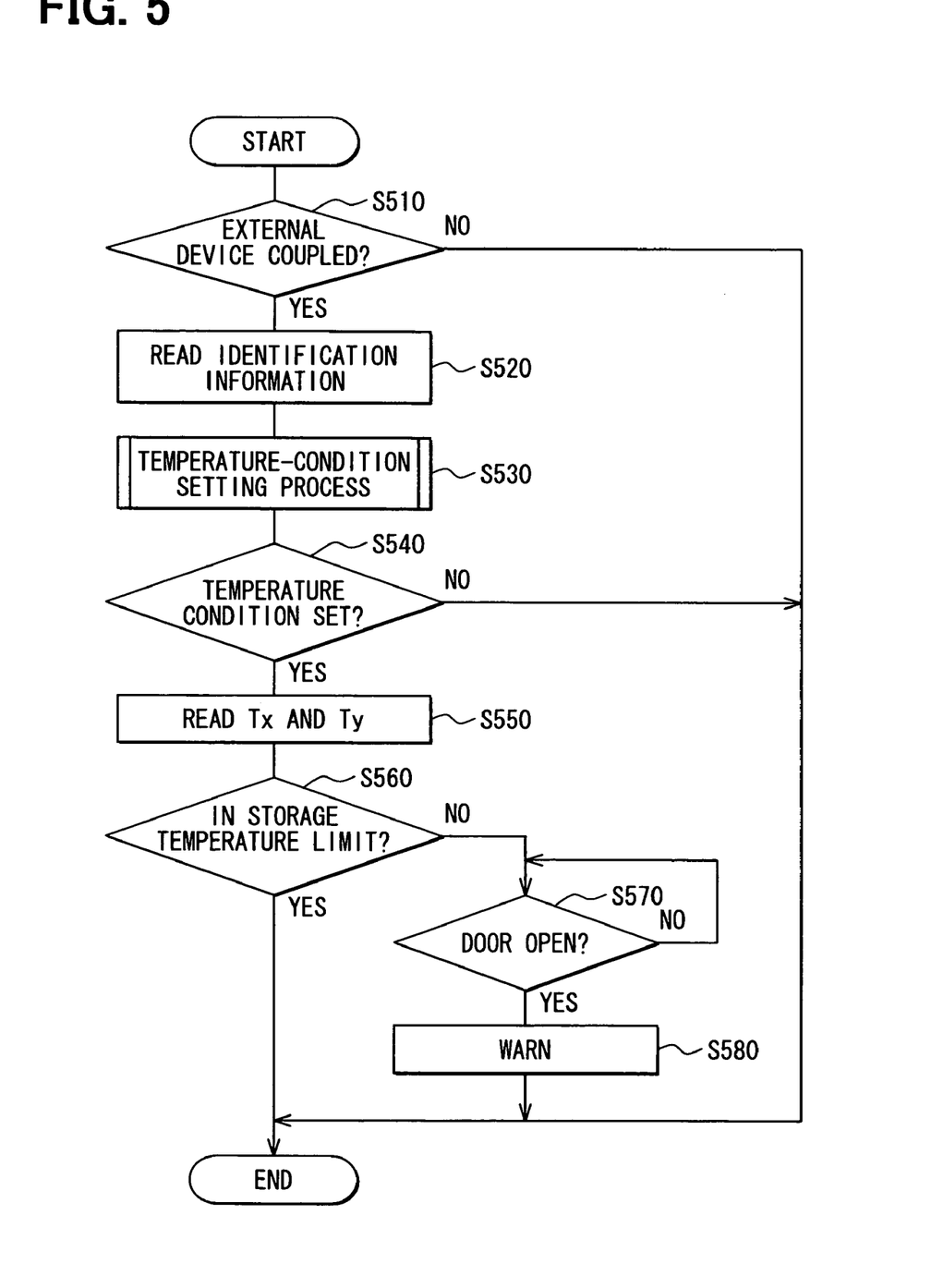
FIG. 5 is a flow diagram showing a storage-temperature monitoring process performed by the ECU.

Next, the storage-temperature monitoring process performed by the ECU 20 will be described with reference to FIG. 5. The storage-temperature monitoring process starts when an engine of the vehicle is stopped, i.e., an ignition switch is turned off. At S510, the ECU 20 determines whether the external device 50 is coupled with the connecting portion 10. If the external device 50 is not coupled with the connecting portion 10 (NO at S510), the storage-temperature monitoring process ends. If the ECU 20 determines that the external device 50 is coupled with the connecting portion 10 (YES at S510), the ECU 20 reads the identification information of the external device 50 from the external device 50 through the connecting portion 10.

At S530, the temperature-condition setting process is performed. In the present case, the temperature-condition setting process is almost similar with the temperature-condition setting process shown in FIG. 4. However, only the storage temperature limit of the external device 50 is set as the temperature condition.

At S540, the ECU 20 determines whether the temperature condition of the external device 50, i.e., the storage temperature limit of the external device 50 is set in the temperature-condition setting process. When the ECU 20 determines that the temperature condition of the external device 50 is set (YES at S540), the ECU 20 advances the process to S550. At S550, the ECU 20 reads the maximum temperature Tx and the minimum temperature Ty at the time where the ACC switch is turned off during the predetermined period including the day, from the memory of the temperature detector 18. At S560, the ECU 20 determines whether the maximum temperature Tx and the minimum temperature Ty are within the storage temperature limit. If the maximum temperature Tx and the minimum temperature Ty are within the storage temperature limit (YES at S560), the temperature in the vehicle compartment has a small possibility of exceeding the storage temperature limit of the external device 50 even when the ACC switch is turned off and the temperature in the vehicle compartment is not controlled. Thus, the storage-temperature monitoring process ends.

If at least one of the maximum temperature Tx and the minimum temperature Ty is out of the storage temperature limit (NO at S560), the ECU 20 determines whether the door switch 16 detects that the opening-and-closing operation of the door at S570. If the opening-and-closing operation of the door is not detected (NO at S570), the process at S570 is repeated. If the opening-and-closing operating of the door is detected (YES at S570), the ECU 20 determines that the passenger is going to get out of the vehicle. Thus, at S580, the display panel 6 shows the warning image and/or the audio output unit 8 generates the waning sound for warning the passenger that the external device 50 has a possibility of being broken due to the temperature in the vehicle compartment if the external device 50 is left in the vehicle compartment. Then, the storage-temperature warning process ends.

As described above, the navigation device 1 is installed in the vehicle and includes the connecting portion 10 to be coupled with the external device 50 so as to send and receive information with the external device 50. The navigation device 1 supplies electric power to the external device 50 through the connecting portion 10 and detects the temperature in the vehicle compartment using the temperature detector 18. In addition, the ECU 20 determines whether the current temperature in the vehicle compartment is within the operating temperature limit set in the temperature-condition setting process, and the ECU 20 stops the power supply to the external device 50 when the current temperature is out of the operating temperature limit.

Thus, the external device 50 is not operated when the temperature in the vehicle compartment is out of the operating temperature limit, and thereby the external device 50 is prevented from malfunctioning or being broken. As a result, the external device 50 coupled with the navigation device 1 can be prevented from malfunctioning or being broken due to the temperature environment.

In addition, the navigation device 1 automatically starts the power supply to the external device 50 when the ECU 20 determines that the current temperature in the vehicle compartment is within the operating temperature limit. Furthermore, the ECU 20 determines whether the current temperature is within the operating temperature limit when the ECU 20 detects that the external device 50 is coupled with the connecting portion 10. Thus, the ECU 20 makes the determination when the external device 50 starts its operation, and the navigation device 1 can start the power supply to the external device 50 only when the ECU 20 determines that the current temperature is within the operating temperature limit and that the external device 50 has no possibility of malfunctioning or being broken even if the external device 50 is operated.

The navigation device 1 supplies electric power to the external device 50 coupled with the connecting portion 10 when the external device 50 is the device that requires the power supply. However, when the current temperature is out of the operating temperature limit, the navigation device 1 stops the power supply to the external device 50 and the communication with the external device 50. Thus, the external device 50 is not operated and a temperature increase of the external device 50 is restricted.

In addition, in the navigation device 1, the temperature detector 18 stores the maximum temperature Tx and the minimum temperature Ty of the predetermined period in the memory, based on the temperature in the vehicle compartment detected by the temperature sensor during the ACC switch is turned off, that is, during the vehicle is parked.

When the ACC switch is turned on, the ECU 20 determines whether the maximum temperature Tx and the minimum temperature Ty stored in the memory are within the storage temperature limit of the external device 50. If at least one of the maximum temperature Tx and the minimum temperature Ty is out of the storage temperature limit, the navigation device 1 provides a preliminary warning to the passenger by using the display panel 6 and/or the audio output unit 8 to warn that the temperature in the vehicle compartment has a possibility of exceeding the storage temperature limit during the vehicle is parked.

Similarly, when the ignition switch is turned off, the ECU 20 determines whether the maximum temperature Tx and the minimum temperature Ty stored in the memory are within the storage temperature limit, and further determines whether the passenger is going to get out of the vehicle based on the detected result of the door switch 16 for detecting the opening-and-closing operation of the door. If at least one of the maximum temperature Tx and the minimum temperature Ty is out of the storage temperature limit, and the passenger is going to get out of the vehicle, the navigation device 1 provides a final warning to the passenger by using the display panel 6 and/or the audio output unit 8.

The maximum temperature Tx and the minimum temperature Ty are extracted from temperature detected at the time where the vehicle is parked during the predetermine period, and the maximum temperature Tx and the minimum temperature Ty of the predetermined period are used as an estimated temperature that is possible in the vehicle compartment during the vehicle is parked. Then, the navigation device 1 warns the passenger when at least one of the maximum temperature Tx and the minimum temperature Ty is out of the storage temperature limit and the passenger is going to get out of the vehicle.

In this way, the navigation device 1 warns the passenger in two steps including the preliminary warning and the final warning. Thus, the device navigation 1 can warn the passenger effectively, for example, when the passenger gets out of the vehicle and the passenger is difficult to know a condition of the external device 50, and when the passenger gets out of the vehicle and temperature in the vehicle compartment has a possibility of increasing or decreasing with respect to when the passenger is in the vehicle compartment, and thereby the external device 50 has a high possibility of being broken.

When the navigation device 1 only provides the final warning, the passenger receives a first warning after the passenger gets out of the vehicle. Thus, the passenger has to get in the vehicle again to bring out the external device 50. However, when the navigation device 1 also provides the preliminary warning, the passenger can recognize a necessity of bring out the external device 50 before getting out of the vehicle. Thus, the passenger can remove the external device 50 from the connecting portion 10 in advance and can bring out the external device 50 from the vehicle compartment when the passenger gets out of the vehicle.

In addition, even if the passenger forgets to remove the external device 50 from the connecting portion 10 when the passenger gets out of the vehicle in spite of receiving the preliminary warning, the passenger can be reminded by the final warning to bring out the external device 50 before the passenger is away from the vehicle. Thus, the navigation device 1 can prevent the external device 50 coupled with the connecting portion 10 from being broken due to the temperature environment.

Furthermore, the navigation device 1 reads the identification information from the external device 50 coupled with the connecting portion 10 and the ECU 20 makes the determination based on the device temperature data (i.e., the operating temperature limit and the storage temperature limit) that is set for each external device 50 in advance in accordance with the identification information. Thus, the navigation device 1 can stop the power supply to the external device 50 and can warn the passenger that the temperature in the vehicle compartment is out of the operating temperature limit or the storage temperature limit, more appropriately.

The navigation device 1 includes the communication unit 14 for communicating with the information center, and the navigation device 1 acquires the device temperature data and the power necessity data from the database at the information center through the communication unit 14. Thus, even when the database 12 of the navigation device 1 stores no information about the external device 50 coupled with the connecting portion 10, the navigation device 1 can acquire the device temperature data and the power necessity data from the information center.

In addition, the operating temperature limit and the storage temperature limit can be input through the external input unit 4. Thus, even when the operating temperature limit and the storage temperature limit of the external device 50 are not specified, the ECU 20 can make the determination by using the input temperature limits. Thereby, the external device 50 can be protected.

In the present embodiment, the navigation device 1 functions as the protection device. The external input unit 4 and the process at S450 correspond to input means, connecting portion 10 corresponds to power supply means, communication unit 14 corresponds to communication means, the door switch 16 and the process at S570 correspond to passenger detection means, the temperature detector 18 corresponds to temperature detection means, and the display panel 6, the audio output unit 8, the processes at S260 and S580 correspond to warning means.

Figure 4:
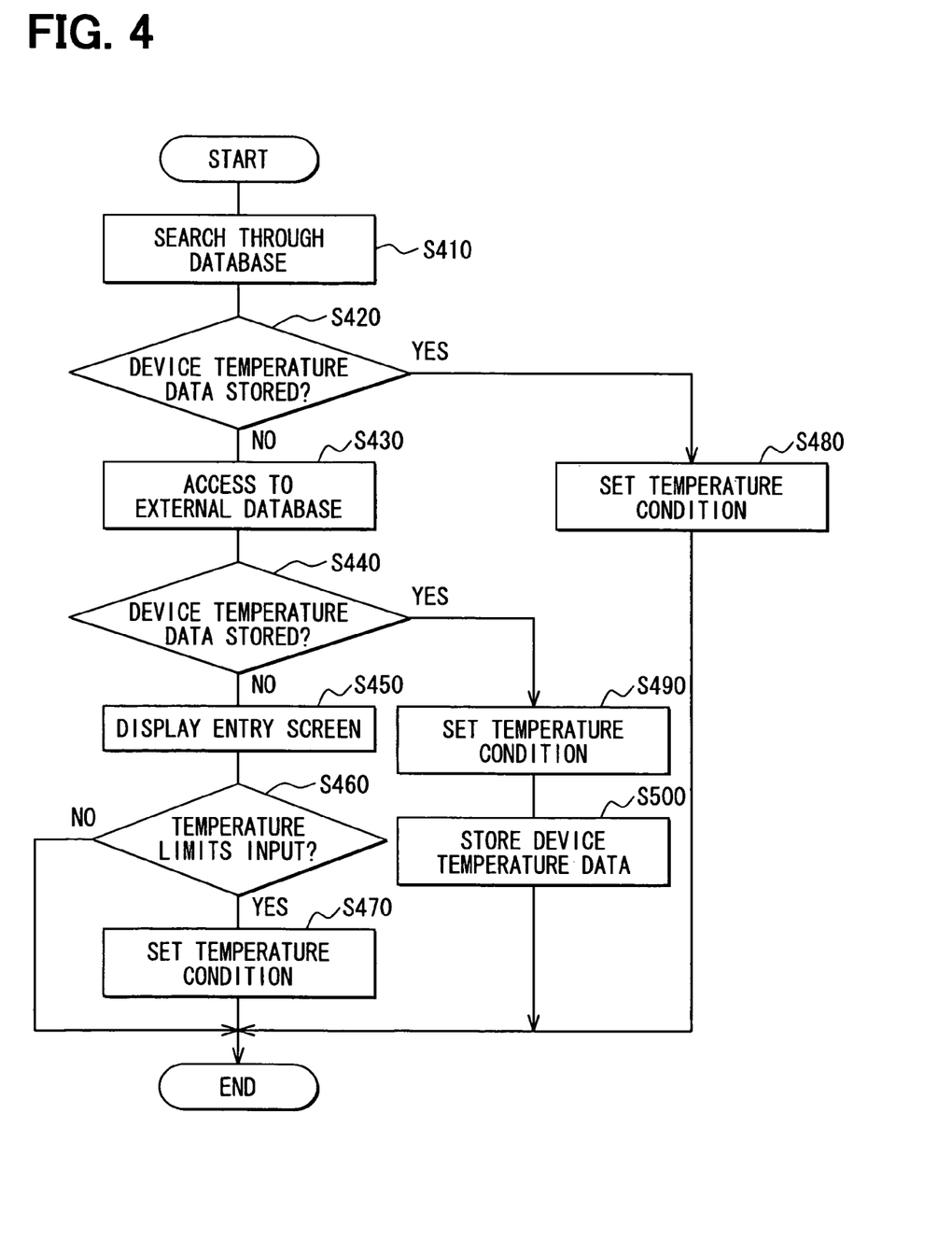
FIG. 4 is a flow diagram showing a temperature-condition setting process performed by the ECU.

Furthermore, the temperature recording process shown in FIG. 4 corresponds to temperature estimation means, the processes at S260, S270, S310, S350, and S560 correspond to temperature determination means, the process at S340 corresponds to prohibition means, the processes at S330, S360, and S370 correspond to power supply means, the processes at S360 and S390 correspond to permission means, the process at S210 and S510 correspond to external-device detection means, the process at S290 corresponds to power-supply determination means, the process at S220 and S520 correspond to external-device identification means, and the process at S430 corresponds to temperature-limit acquisition means.

OTHER EMBODIMENTS

In the above-described embodiment, the protection device is included in the navigation device 1 as an example. Alternatively, the protection device may be included in other device installed in the vehicle or may be an independent device.

In the above-described embodiment, the navigation device 1 performs both of the operating-environment monitoring process and the storage-temperature monitoring process, as an example. Alternatively, the navigation device 1 may be configured to perform one of a process for protecting the external device 50 being operated in the vehicle compartment and a process for protecting the external device 50 left in the vehicle compartment when the passenger is away from the vehicle. In the process for protecting the external device 50 left in the vehicle compartment, the navigation device 1 may provide only one of the preliminary warning and the final warning.

In the above-described embodiment, the ECU 20 determines whether the external device 50 requires power supply based on the power necessity data set for each device. Alternatively, the ECU 20 may communicate with the external device 50 and may determine whether the external device 50 requires power supply based on information sent from the external device 50.

In the above-described embodiment, the door switch 16 for detecting the opening-and-closing operation of the door is used as the passenger detection means. Alternatively, a seat sensor that is attached to a seat in the vehicle for detecting whether the passenger sits in the seat may be used as the passenger detection means, for example. Alternatively, the ignition switch may be used as the passenger detection means. In the present case, it may be determined that the passenger is going to get out of the vehicle when the ignition switch is turned off.

In the above-described embodiment, the temperature condition is set based on the operating temperature limit and the storage temperature limit of the external device 50, as an example. Alternatively, the temperature condition may be narrower than the operating temperature limit and the storage temperature limit to have a margin.

In the above-described embodiment, the operating temperature limit and the storage temperature limit are set for each external device 50, as an example. Alternatively, an operating temperature limit and a storage temperature limit corresponding to a general device may be set as a common temperature condition regardless of the external device 50 coupled with the connecting portion 10.

Figure 3:
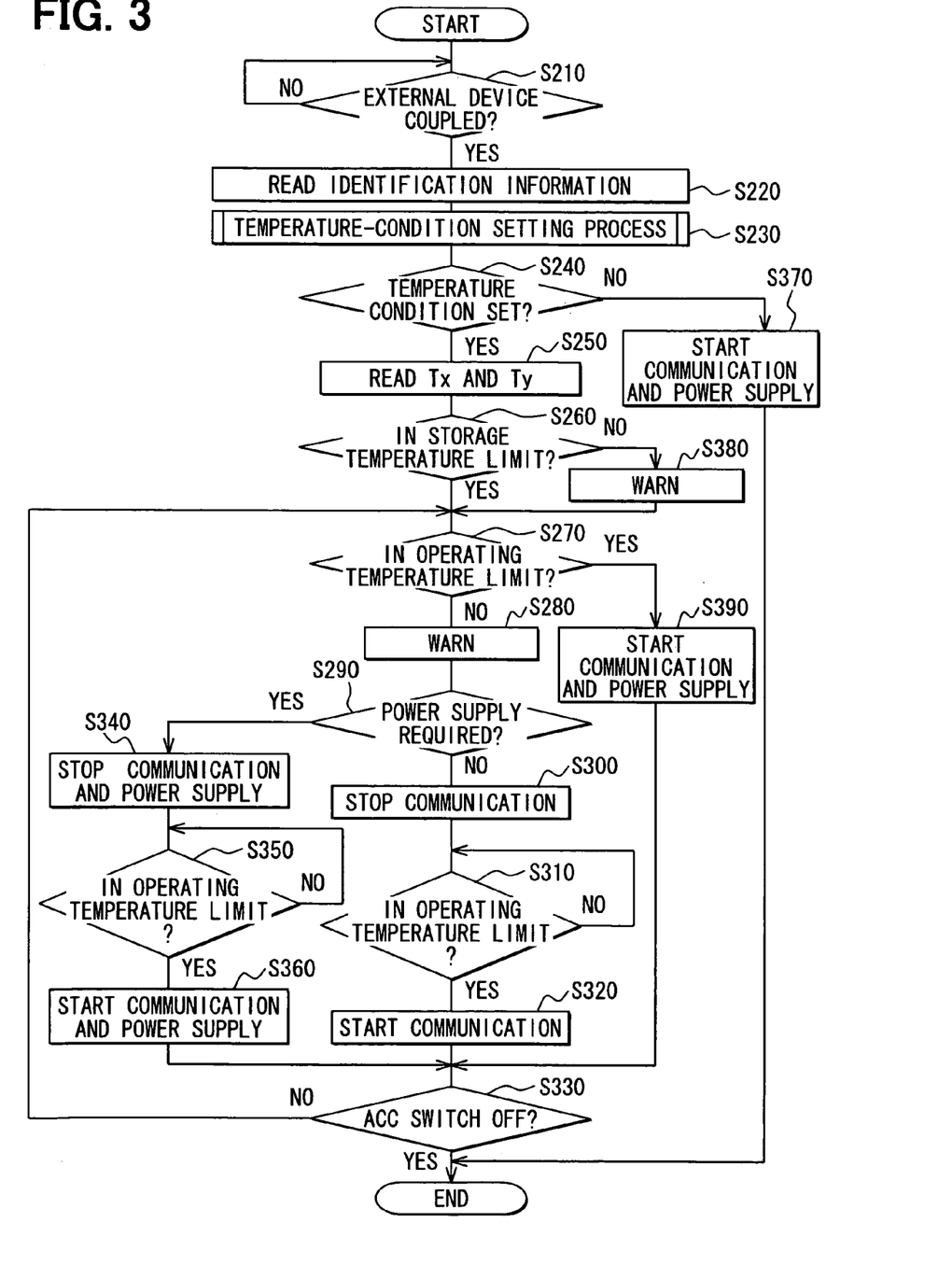
FIG. 3 is a flow diagram showing an operating-environment monitoring process performed by the ECU.

In the operating-environment monitoring process shown in FIG. 3, the current temperature in the vehicle compartment is used for the determinations at S270, S310, and S350. Alternatively, the average temperature, the maximum temperature, and the minimum temperature for the past few seconds may be used as the temperature in the vehicle compartment for the determinations at S270, S310, and S350, for example.

Such changes and modifications are to be understood as being within the scope of the present invention as defined by the appended claims.

What is claimed is:

1. A protection device to be installed in a vehicle for protecting an external device, comprising:
   a connecting portion to be coupled with the external device for sending and receiving information with the external device;
   power supply means for supplying electric power to the external device through the connecting portion;
   temperature detection means for detecting temperature in a vehicle compartment;
   temperature determination means for determinating whether the detected temperature is within a predetermined first temperature limit; and
   prohibition means for stopping the power supply to the external device when the temperature determination means determines that the detected temperature is out of the first temperature limit.

2. The protection device according to claim 1, further comprising
   permission means for permitting the power supply to the external device when the temperature determination means determines that the detected temperature is within the first temperature limit.

3. The protection device according to claim 1, further comprising
   external-device detection means for detecting whether the external device is coupled with the connecting portion, wherein
   the temperature determination means determines whether the detected temperature is within the first temperature limit when the external-device detection means detects that the external device is coupled with the connecting portion.

4. The protection device according to claim 1, further comprising:
   power-supply determination means for determinating whether the external device requires the power supply; and
   communication stop means for stopping the sending and receiving information with the external device when the temperature determination means determines that the detected temperature is out of the first temperature limit, wherein the power supply means starts the power supply to the external device when the power-supply determination means determines that the external device requires the power supply.

5. The protection device according to claim 1, further comprising temperature estimation means and warning means, wherein:
the temperature detection means detects temperature in the vehicle compartment during the vehicle is parked;
the temperature estimation means estimates a temperature that is possible in the vehicle compartment during the vehicle is parked, based on the detected temperature obtained by the temperature detection means during the vehicle is parked;
the temperature determination means determines whether the estimated temperature is within a predetermined second temperature limit; and
the warning means warns when the temperature determination means determines that the estimated temperature is out of the second temperature limit.

6. The protection device according to claim 5, wherein:
the first temperature limit is an operating temperature limit of the external device; and
the second temperature limit is a storage temperature limit of the external device.

7. The protection device according to claim 1, further comprising
external-device identification means for detecting identification information of the external device coupled with the connecting portion, wherein
the first temperature limit is set based on the identification information of the external device.

8. The protection device according to claim 1, further comprising:
communication means for communicating with an external apparatus; and
temperature-limit acquisition means for acquiring the first temperature limit from the external apparatus through the communication means.

9. The protection device according to claim 1, further comprising
input means for inputting the first temperature limit by an external manipulation.

10. A protection device to be installed in a vehicle for protecting an external device, comprising:
a connecting portion to be coupled with the external device for sending and receiving information with the external device;
temperature detection means for detecting temperature in a vehicle compartment;
temperature determination means for determinating whether a determination temperature based on the detected temperature is within a predetermined temperature limit; and
warning means for warning when the temperature determination means determines that the determination temperature is out of the predetermined temperature limit.

11. The protection device according to claim 10, wherein the determination temperature is the detected temperature obtained by the temperature detection means.

12. The protection device according to claim 10, further comprising temperature estimation means, wherein:
the temperature detection means detects temperature in the vehicle compartment during the vehicle is parked;
the temperature estimation means estimates a temperature that is possible in the vehicle compartment during the vehicle is parked, based on the detected temperature obtained by the temperature detection means during the vehicle is parked; and
the determination temperature is the estimated temperature.

13. The protection device according to claim 12, further comprising
passenger detection means for detecting that a passenger is going to get out of the vehicle, wherein
the warning means warns the passenger when the temperature determination means determines that the determination temperature is out of the predetermined temperature and when the passenger detection means detects that the passenger is going to get out of the vehicle.

14. A method of controlling a protection device that is configured to be installed in a vehicle and that has a connecting portion to be coupled with an external device, the method comprising:
detecting temperature in a vehicle compartment;
determining whether the detected temperature is within a predetermined first temperature limit; and
supplying electric power to the external device when the detected temperature is within the first temperature limit and stopping the power supply to the external device when the detected temperature is out of the first temperature limit.

15. The method according to claim 14, further comprising:
determining whether the external device is coupled with the connecting portion; and
determining whether the external device requires the power supply, wherein
the power supply is started when the external device is coupled with the connecting portion and the external device requires power supply.

16. The method according to claim 14, further comprising:
storing temperature in the vehicle compartment detected during the vehicle is parked;
estimating a temperature that is possible in the vehicle compartment during the vehicle is parked based on the stored temperature;
determining whether the estimated temperature is within a predetermined second temperature limit; and
warning when the estimated temperature is out of the second temperature limit.

17. The method according to claim 16, wherein
the estimated temperature is estimated based on a maximum temperature and a minimum temperature that are detected at a time where the vehicle is parked during a predetermined period.

18. The method according to claim 16, further comprising:
reading identification information from the external device; and
setting the first temperature limit and the second temperature limit based on the identification information.

19. The method according to claim 18, wherein:
the first temperature limit is an operating temperature limit of the external device; and
the second temperature limit is a storage temperature limit of the external device.

20. The method according to claim 16, further comprising:
detecting whether passenger is going to get out of the vehicle; and
warning the passenger when the estimated temperature is out of the second temperature limit and when the passenger is going to get out of the vehicle.

* * * * *